(12) United States Patent
Seo et al.

(10) Patent No.: US 9,282,441 B2
(45) Date of Patent: *Mar. 8, 2016

(54) MOBILE COMMUNICATION TERMINAL FOR PTT AND METHOD FOR PROCESSING MISSED CALL INFORMATION THEREOF

(71) Applicant: Samsung Electronics Co., Ltd., Suwon-si (KR)

(72) Inventors: Sang Uk Seo, Daegu (KR); Woo Chan Park, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/701,095

(22) Filed: Apr. 30, 2015

(65) Prior Publication Data

US 2015/0237484 A1 Aug. 20, 2015

Related U.S. Application Data

(63) Continuation of application No. 14/507,495, filed on Oct. 6, 2014, now Pat. No. 9,026,066, which is a continuation of application No. 11/947,476, filed on Nov. 29, 2007, now Pat. No. 8,855,582.

(30) Foreign Application Priority Data

Apr. 4, 2007 (KR) .................. 10-2007-0033094

(51) Int. Cl.
*H04M 1/656* (2006.01)
*H04W 4/10* (2009.01)
(Continued)

(52) U.S. Cl.
CPC ................ *H04W 4/10* (2013.01); *H04M 1/575* (2013.01); *H04M 1/656* (2013.01); *H04M 3/42042* (2013.01); *H04M 3/533* (2013.01); *H04M 15/856* (2013.01); *H04W 76/005* (2013.01); *H04M 2250/60* (2013.01)

(58) Field of Classification Search
CPC ... H04M 1/656; H04M 2250/60; H04W 4/10; H04W 76/005
See application file for complete search history.

(56) References Cited

U.S. PATENT DOCUMENTS 7,899,447 B2 3/2011 Takuno et al.
2004/0224710 A1 11/2004 Koskelainen et al.
(Continued)

FOREIGN PATENT DOCUMENTS

KR 1020050082873 8/2005

OTHER PUBLICATIONS

Non-Final Office Action dated Sep. 24, 2010, in U.S. Appl. No. 11/947,476.
(Continued)

*Primary Examiner* — David Bilodeau
(74) *Attorney, Agent, or Firm* — H.C. Park & Associates, PLC

(57) ABSTRACT

The present invention relates to a mobile communication terminal for Push To Talk (PTT) and a method for processing missed call information thereof, which allows a receiver to check why an originator requested the PTT telephone call during the absence of the receiver through missed call information. The missed call information includes the voice of the originator requesting the PTT call, and the voice of the originator is output when confirmation of the missed call information is requested.

20 Claims, 6 Drawing Sheets

(51) Int. Cl.
*H04M 3/533* (2006.01)
*H04M 15/00* (2006.01)
*H04M 3/42* (2006.01)
*H04W 76/00* (2009.01)
*H04M 1/57* (2006.01)

(56) References Cited

U.S. PATENT DOCUMENTS

| | | |
|---|---|---|
| 2005/0079884 A1 | 4/2005 | Lazaridis |
| 2005/0164681 A1 | 7/2005 | Jenkins et al. |
| 2005/0250476 A1 | 11/2005 | Worger et al. |
| 2006/0003740 A1 | 1/2006 | Munje |
| 2006/0121925 A1 | 6/2006 | Jung |
| 2006/0258336 A1 | 11/2006 | Sajor et al. |
| 2006/0270362 A1 | 11/2006 | Emrich et al. |
| 2006/0270429 A1 | 11/2006 | Szymanski et al. |
| 2007/0010292 A1 | 1/2007 | Vetelainen et al. |
| 2007/0021138 A1 | 1/2007 | Allen et al. |
| 2007/0232277 A1 | 10/2007 | Spalink |
| 2007/0232295 A1 | 10/2007 | Bell et al. |
| 2008/0198422 A1 | 8/2008 | Casey et al. |
| 2008/0220728 A1 | 9/2008 | Seo |
| 2008/0233932 A1 | 9/2008 | Sapp |
| 2009/0280789 A1 | 11/2009 | Takuno et al. |
| 2009/0298444 A1 | 12/2009 | Shigeta |

OTHER PUBLICATIONS

Final Office Action dated Feb. 24, 2011, in U.S. Appl. No. 11/947,476.
Non-Final Office Action dated Jun. 24, 2011, in U.S. Appl. No. 11/947,476.
Final Office Action dated Apr. 11, 2012, in U.S. Appl. No. 11/947,476.
Non-Final Office Action dated Sep. 18, 2012, in U.S. Appl. No. 11/947,476.
Notice of Allowance issued on May 10, 2013, in U.S. Appl. No. 11/947,476.
Non-Final Office Action dated Aug. 26, 2013, in U.S. Appl. No. 11/947,476.
Notice of Allowance dated Jan. 6, 2015, in U.S. Appl. No. 14/507,495.

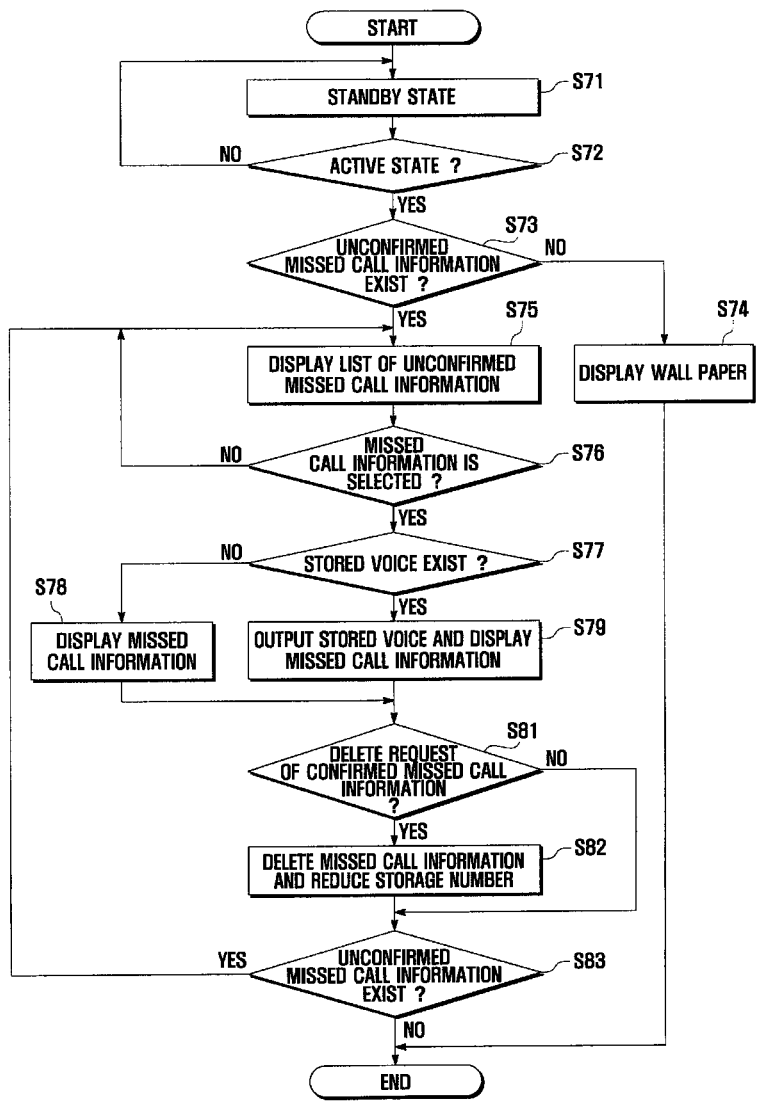

MOBILE COMMUNICATION TERMINAL FOR PTT AND METHOD FOR PROCESSING MISSED CALL INFORMATION THEREOF

CROSS REFERENCE TO RELATED APPLICATIONS

The present application is continuation of U.S. patent application Ser. No. 14/507,495, filed on Oct. 6, 2014, which is a continuation of U.S. patent application Ser. No. 11/947,476, filed on Nov. 29, 2007, and claims priority from and the benefit of Korean Patent Application No. 10-2007-0033094, filed on Apr. 4, 2007, each of which is hereby incorporated by reference for all purposes as if fully set forth herein.

BACKGROUND OF THE INVENTION

1. Field of the Invention

The present invention relates to a mobile communication terminal and a method for processing information thereof, and more particularly, to a mobile communication terminal that performs Push To Talk (PTT) communication and a method for processing information of a missed call.

2. Discussion of the Background

Developments in mobile communication technology and manufacturing technology for mobile communication terminals have resulted in mobile communication terminals that are capable of performing various functions with simple portability. In particular, mobile communication terminals equipped with PTT communication modules have recently been introduced.

Here, PTT communication refers to a communication method of a wireless telephone set, and it is one of wireless communication methods by which a user can perform a conversation. The user may perform a conversation by pressing down a PTT key prepared in the wireless telephone set when the user is talking to another party and releasing the PTT key when the user is listening to the other party. PTT communication may provide a multipoint wireless communication service as well as one-to-one service.

In particular, as to the mobile communication terminal, PTT communication service can be provided using Voice over IP (VoIP) after assigning an intrinsic Internet Protocol (IP) address. A conversation between mobile communication terminals for PTT begins when the originator requests a PTT telephone call by pressing down a PTT key. PTT conversation may be performed when the receiver responds to the received PTT telephone call by pressing down a PTT key.

When the receiver does not receive the PTT call, the receiver's mobile communication terminal stores the missed call information. When the receiver activates the mobile communication terminal for PTT, the missed call information that has not be confirmed by the user may be displayed in a display unit. The missed call information may include the originator information and the time at which the missed call occurred. The originator information may be the phone number of the originator or the name of the originator.

Therefore, as the missed call information of the related art includes only the originator information and the time at which the missed call occurred, the receiver is notified only that there has been a missed call and cannot know the reason why the originator requested a PTT telephone call from the missed call information.

SUMMARY OF THE INVENTION

The present invention provides a mobile communication terminal for PTT communication and a method for processing information of a missed call that allows a receiver to check why the originator of the missed call requested the PTT telephone call.

The present invention further provides a mobile communication terminal for PTT communication and a method for processing information of a missed call, in which missed call information including the voice of an originator requesting a PTT call is stored and the voice of the originator is output when confirmation of the missed call information is requested.

Additional features of the invention will be set forth in the description which follows, and in part will be apparent from the description, or may be learned by practice of the invention.

The present invention discloses a method of processing information of a missed PTT including buffering the voice of an originator of a PTT call, determining whether the PTT call is a missed call, storing missed call information including the buffered voice when it is determined that the PTT call is a missed call, and outputting the buffered voice included in the missed call information in response to a request for confirmation of the missed call information is requested.

The present invention also discloses a mobile communication terminal for PTT including a PTT communications module, a voice processor, a buffering unit, a missed call determining unit, a storage, and a PTT telephone call controller. The PTT communications module performs PTT communication. The voice processor processes the voice of an originator of a PTT call, which the PTT communications module received, and outputs the processed voice. The buffering unit buffers the voice of the originator. The missed call determining unit determines whether a missed call has occurred. The storage stores missed call information including the buffered voice when it is determined that a missed call occurred. The PTT telephone call controller outputs the buffered voice included in the missed call information when confirmation of the missed call information is requested.

The present invention also discloses a method of processing a missed call information of a mobile communications terminal for PTT including storing missed call information including the voice of an originator requesting a PTT call in a standby state, displaying a list of unconfirmed missed call information among the stored missed call information when the standby state is converted to an active state, and outputting the voice of the originator included in selected missed call information when unconfirmed missed call information is selected.

The present invention also includes a mobile communications terminal for PTT including a voice processor, a storage, a display unit, and a PTT telephone call controller. The voice processor receives a PTT call in a standby state, processes the voice of an originator of the PTT call, and outputs the processed voice. The storage stores missed call information including the voice of the originator when a missed call occurs. The display unit displays a list of unconfirmed missed call information among the stored missed call information when the standby state is converted to an active state. The PTT telephone call controller outputs the voice of the originator included in selected missed call information when unconfirmed missed call information is selected.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 5 is a flowchart showing the process of displaying missed call information in the method of processing a missed call of a mobile communication terminal for PTT according to an exemplary embodiment of the present invention.

DETAILED DESCRIPTION OF THE ILLUSTRATED EMBODIMENTS

Figure 1:
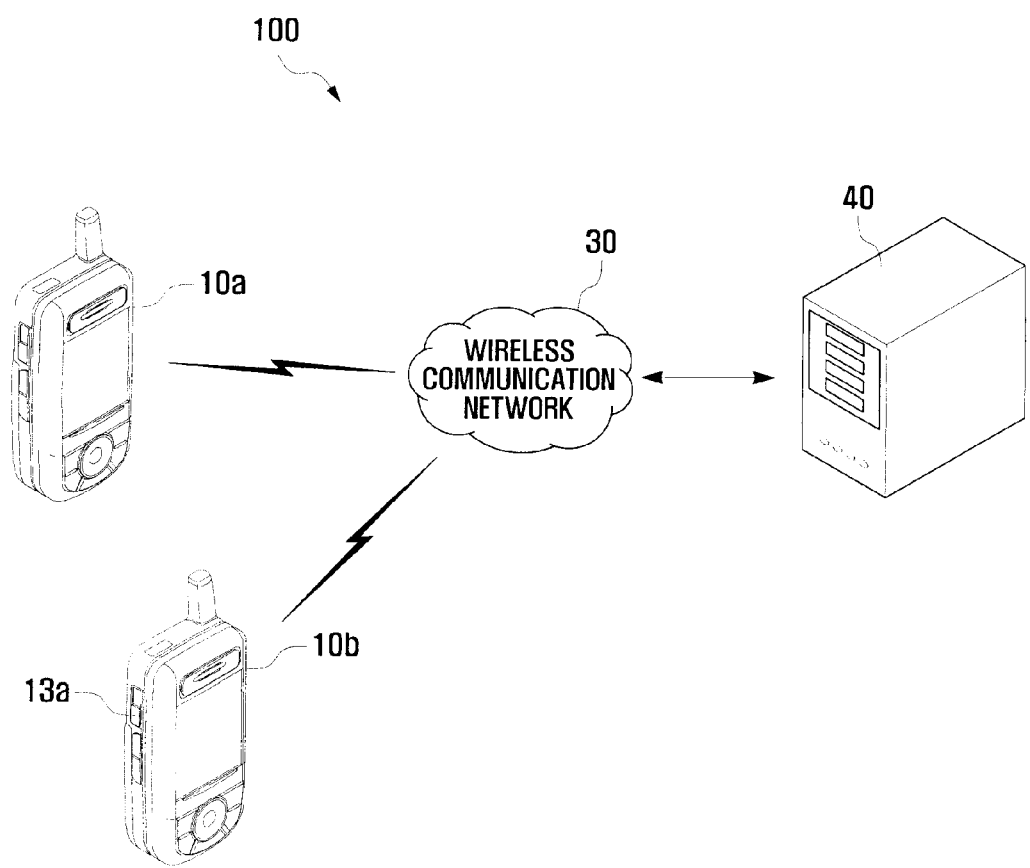
FIG. 1 shows the configuration of a PTT communication system using a mobile communication terminal for PTT according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Here, a mobile communication terminal for PTT is a mobile communication terminal that performs PTT communication and may include a digital broadcast terminal, Personal Digital Assistant (PDA), a smart phone, an International Mobile Telecommunication 2000 (IMT-2000) terminal, a Wideband Code Division Multiple Access (WCDMA) terminal and an Universal Mobile Telecommunication Service (UMTS) terminal.

FIG. 1 is a drawing showing the configuration of a PTT communication system 100 using mobile communication terminals for PTT 10a, 10b according to an exemplary embodiment of the present invention.

Referring to FIG. 1, the PTT communication system 100 may include a mobile communication terminal for PTT for the outgoing side 10a, a mobile communication terminal for PTT for the receiving side 10b, and a PTT server 40. Here, the mobile communication terminals for PTT for the outgoing side and the receiving side 10a, 10b are coupled to the PTT server 40 through a wireless communication network 30 to perform a PTT call.

The wireless communication network 30 may include a Mobile Switching Center (MSC) and a Base Station (BS) Transceiver System. The BS Transceiver System performs communications with multiple mobile communication terminals for PTT 10a, 10b positioned in a corresponding service area and is coupled to the MSC through a Base Station Controller (BSC). The MSC is coupled to the PTT server 40 through a data network.

The PTT server 40 performs arbitration, performs maintenance of PTT communication requests, distributes the registration list by each subscriber, and manages the real time operation of a PTT user group including the connection and release of a call of a necessary system and a network resource as well as an overall control operation for the PTT user group.

Accordingly, the PTT server 40 delivers voice output from the mobile communication terminal for PTT for the outgoing side 10a to the mobile communication terminal for PTT for the receiving side 10b through the wireless communication network 30.

The PTT server 40 performs a PTT telephone call with the mobile communication terminal for PTT for the outgoing side 10a according to the selection of a PTT key 13a of the mobile communication terminal for PTT for the receiving side 10b.

Figure 2:
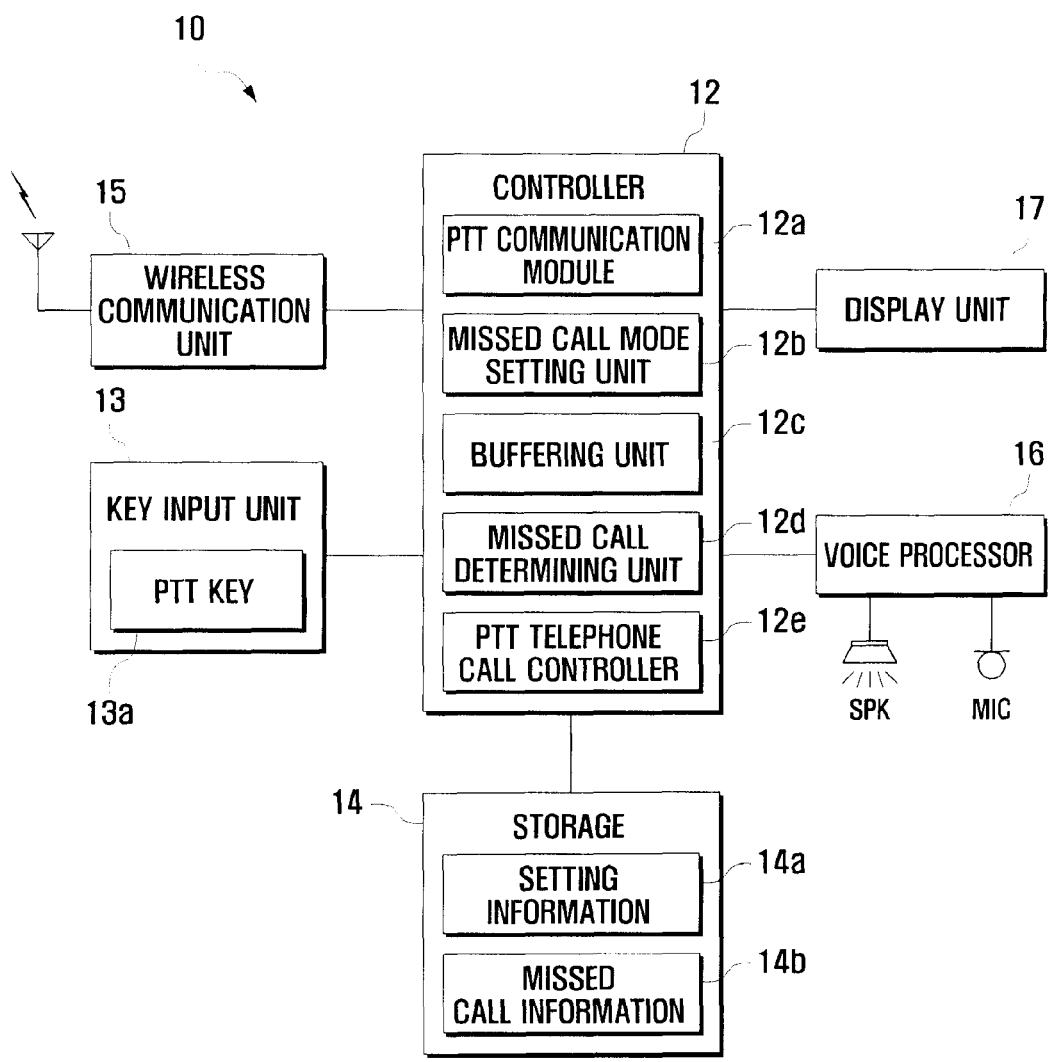
FIG. 2 is a block diagram showing the configuration of a mobile communication terminal for PTT of FIG. 1.

In this case, as to the configuration of the PTT communication system 100 according to an exemplary embodiment of the present invention, the mobile communication terminals for PTT shown in FIG. 2 may be the mobile communication terminals for PTT for the outgoing side 10a or for the receiving side 10b. However, for convenience, the mobile communication terminal for PTT for the receiving side 10b, which receives the missed call, is used to describe the mobile communication terminal for PTT 10 shown in FIG. 2.

FIG. 2 is a block diagram showing the configuration of a mobile communication terminal for PTT 10 of FIG. 1. Referring to FIG. 1 and FIG. 2, the mobile communication terminal for PTT 10 according to the exemplary embodiment of the present invention includes a controller 12, a key input unit 13, storage 14, a wireless communication unit 15, a voice processor 16, and a display unit 17.

Here, the mobile communication terminal for PTT 10 can be used as a mobile communication terminal for PTT for the outgoing side 10a or the receiving side 10b. However, in exemplary embodiments of the present invention, it is exemplified that the mobile communication terminal for PTT is used as the receiving side, which receives a missed call.

The controller 12 performs the overall control operation of the mobile communication terminal for PTT 10. The controller 12 processes missed call information of a received PTT call. The key input unit 13 provides a plurality of keys for the manipulation of the mobile communication terminal for PTT 10 and generates a key data according to the key selection of the user to deliver it to the controller 12. The key input unit 13 includes a PTT key 13a that performs PTT communications and, in addition, may include a function key such as a cancel key, a confirmation key, a numeric key, a 4-direction key, and/or an end key. Various input means including a key pad, a touch screen, and a touch pad can be used as a key input unit 13.

The storage 14 stores a program that is necessary for controlling the operation of the mobile communication terminal for PTT 10 and stores data that is generated during the execution of the program. The storage 14 also stores an executive program for performing a PTT telephone call and an executive program for processing missed call information. The storage 14 includes setting information 14a of the missed call and missed call information 14b. Here, the missed call information 14b includes an originator phone number and the time at which the missed call occurred and may further include voice information of the originator.

The wireless communication unit 15 modulates and performs frequency translation for the data output from the controller 12 and sends a wireless signal through an antenna ANT. Further, the wireless communication unit 15 separates a received signal from a wireless signal received through the antenna ANT. Particularly, the wireless communication unit 15 transceives a voice for PTT call.

The voice processor 16 digitalizes the voice input through a microphone MIC under the control of the controller 12 and demodulates the voice data received through the wireless communication unit 15 to output it through a speaker SPK. During a PTT call, the voice processor 16 outputs the voice of the originator, which is received through the wireless communication unit 15, through the speaker SPK and receives the voice of the receiver through the microphone MIC to output it to the mobile communication terminal for PTT for the outgoing side 10*a* through the wireless communication unit 15. Particularly, the voice processor 16 outputs the voice included in the missed call information 14*b* when confirming the missed call information 14*b*.

The display unit 17 displays information stored in the storage 14 in addition to various function menus executed in the mobile communication terminal for PTT 10. The display unit 17 displays a setting menu of setting information in a user's absence, setting information 14*a*, and missed call information 14*b*. In this case, a Liquid Crystal Display (LCD) or a touch screen can be used as display unit 17. The touch screen may simultaneously play a role of a display unit and an input device. Particularly, the controller 12 performs a PTT call and processes missed call information for the received PTT call. The controller 12 includes a PTT communication module 12*a*, a missed call mode setting unit 12*b*, a buffering unit 12*c*, a missed call determining unit 12*d*, and a PTT telephone call controller 12*e*. The PTT communication module 12*a* performs PTT communication. During PTT communication, the voice processor 16 processes the voice of the originator of the PTT telephone call that the PTT communication module 12*a* received and outputs it to the speaker SPK.

The missed call mode setting unit 12*b* sets a time for buffering the voice of the originator of a PTT telephone call according to the key input of the user and sets the maximum storage number for missed call information. In this case, the buffering time may be several seconds to several tens of seconds. The maximum storage number for missed call information may be within the total capacity of the storage 14.

The buffering unit 12*c* buffers the voice of the originator of the received PTT telephone call within the set buffering time. When the buffering time is over, the buffer 12*c* stops buffering.

The missed call determining unit 12*d* determines whether there is a response to the received PTT call. When there is no response, the missed call determining unit 12*d* determines that a missed call has occurred. The missed call determining unit 12*d* determines whether there is a response according to the selection of the PTT key 13*a* and determines if a missed call has occurred according to whether there is a response.

When it is determined that there is a missed call, the PTT telephone call controller 12*e* stores the missed call information 14*b*, including the buffered voice, in the storage 14 for the received PTT call. When confirmation of the missed call information 14*b* is requested from the PTT telephone call controller 12*e*, the voice included in the requested missed call information 14*b* is output to the voice processor 16. The PTT telephone call controller 12*e* displays the originator information and the time when the missed call occurred among the requested missed call information 14*b* on the display unit 17. The PTT telephone call controller 12*e* can delete the missed call information 14*b* including the voice of the originator once it is confirmed by key input through the key input unit 13.

The PTT telephone call controller 12*e* determines the storage number of the missed call information 14*b* and determines whether the storage number of the missed call information 14*b* is less than or equal to the maximum storage number. When it is determined that the storage number exceeds the maximum storage number, the PTT telephone call controller 12*e* does not buffer the voice of the originator of the PTT telephone call, which is received through the buffering unit 12*c*. Therefore, when the storage number of the missed call information 14*b* exceeds the maximum storage number, the PTT telephone call controller 12*e* stores only the originator phone number and the time when the missed call occurred as missed call information 14*b*.

On the other hand, when it is determined by the missed call determining unit 12*d* that a response has occurred, the PTT telephone call controller 12*e* deletes the buffered voice and performs the PTT telephone call with the mobile communications terminal for PTT for the outgoing side 10*a* through the PTT communication module 12*a*.

Therefore, as to the mobile communications terminal 10 for PTT according to an exemplary embodiment of the present invention, if missed call information is generated for a received PTT call, the voice of the originator of the received PTT telephone call is stored in the missed call information 14*b*. If confirmation of the missed call information 14*b* is requested, the voice of the originator included in the missed call information 14*b* is output. Therefore, by hearing the voice of the originator, a receiver may be able to determine why the originator requested the PTT call.

Figure 3:
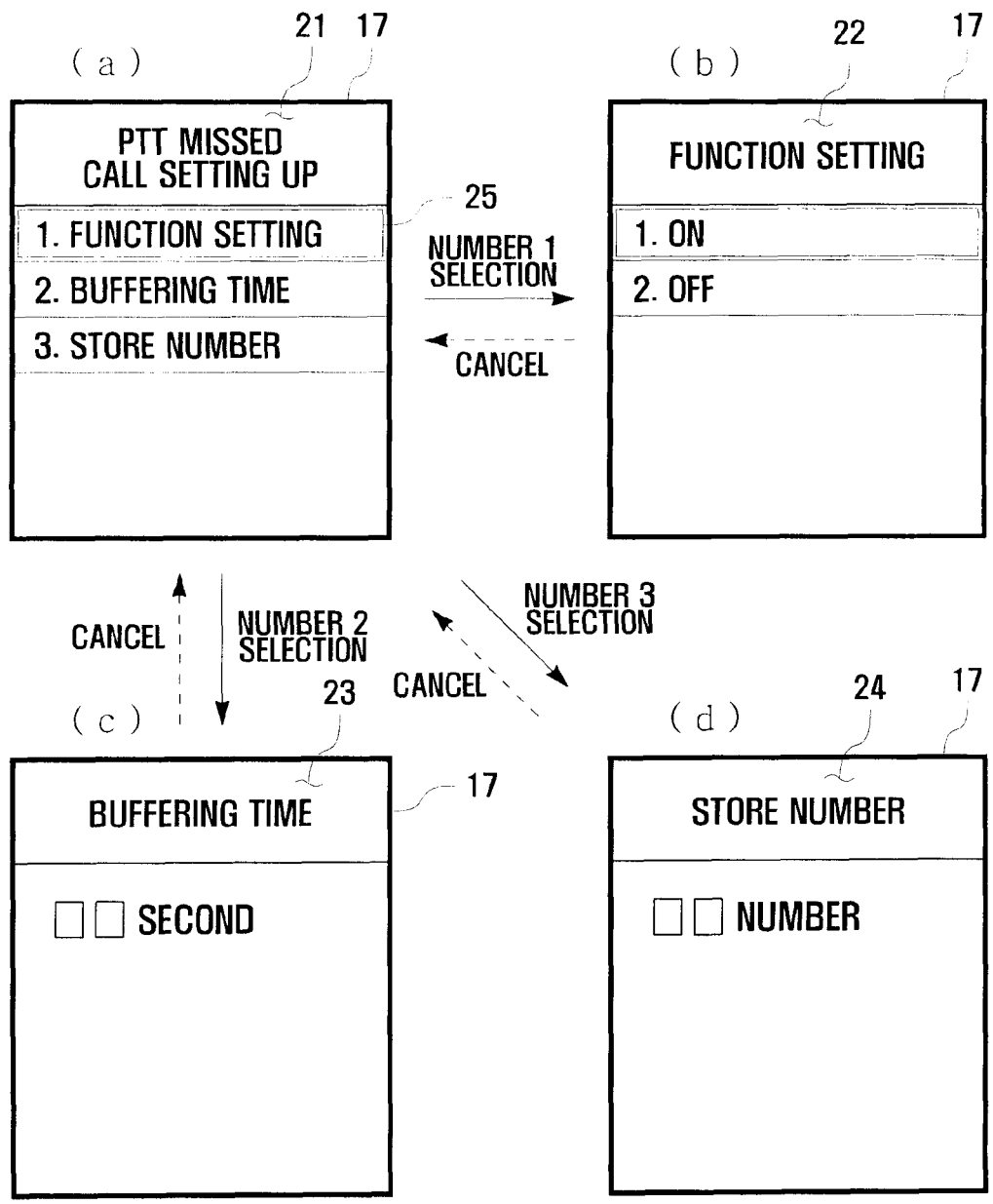
FIG. 3 shows an example of a screen that shows the procedure of setting up a missed call mode in the method of processing a missed call of a mobile communication terminal for PTT according to an exemplary embodiment of the present invention.

FIG. 3 is a drawing showing an example of a screen that shows the procedure of setting up a missed call mode in the method of processing a missed call of a mobile communication terminal for PTT according to an exemplary embodiment of the present invention. Referring to FIG. 1, FIG. 2, and FIG. 3, the setup procedure of the missed call mode will be shown.

Firstly, as shown in FIG. 3(*a*), when the setup menu of the missed call mode is selected according to the key selection of the key input unit 13, the missed call mode setting unit 12*b* displays a setup menu 21 on the display unit 17. At this time, the setup menu 21 includes a function setting menu, a buffering time setting menu, and a storage number setting menu as a lower menu, while the lower menu can be displayed as a list of the text base.

A lower menu can be selected using a numeric key of the key input unit 13. Otherwise, a 4-direction key of the key input unit 13 may be manipulated to position a focus 25 at the lower menu to be selected, and a verification key may be pressed to select the focused lower menu. When a specific lower menu is displayed and the cancel key of the key input unit 13 is pressed, the missed call mode setting unit 12*b* displays a setup menu 17.

As shown in FIG. 3(*b*), when the function setting menu is selected through the key selection of the key input unit 13, the missed call mode setting unit 12*b* displays a function setting menu 22 on the display unit 17. The items of the function setting menu 22 are "ON" and "OFF". Here, if "OFF" is selected, the missed call mode setting unit 12*b* inactivates the processing function of the missed call information according to an exemplary embodiment of the present invention. However, if "ON" is selected, the missed call mode setting unit 12*b* begins processing the missed call information according to an exemplary embodiment of the present invention. At this time, according to the set up buffering time and the set up storage number, the PTT telephone call controller 12*e* performs the processing function of the missed call information.

As shown in FIG. 3(*c*), when the buffering time setting menu is selected through key selection of the key input unit 13, the missed call mode setting unit 12*b* displays a buffering time setting menu 23 on the display unit 17. In the buffering time setting menu 23, a numeric key of the key input unit 13 may be pressed to input a set buffering time.

As shown in FIG. 3(*d*), when the storage number setup menu is selected by key selection of the key input unit 13, the missed call mode setting unit 12b displays a storage number setup menu 24 on the display unit 17. In the storage number setup menu 24, a numeric key of the key input unit 13 may be pressed to input a maximum storage number.

In the present exemplary embodiment, the example in which the lower menus were displayed on the setup menu 21 as text was disclosed. However, the lower menus can be displayed as icons.

Figure 4A:
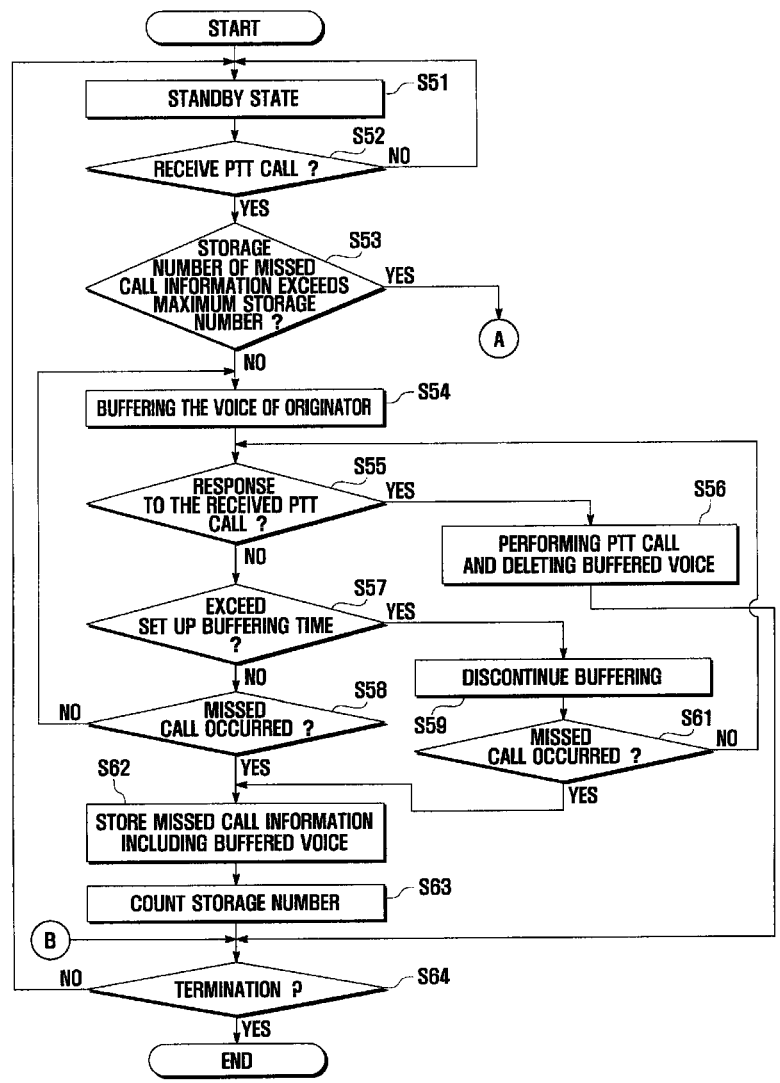
FIG. 4A and FIG. 4B are flowcharts showing the storage process of a missed call in the processing method of a missed call of a mobile communication terminal for PTT according to an exemplary embodiment of the present invention.
Figure 4B:
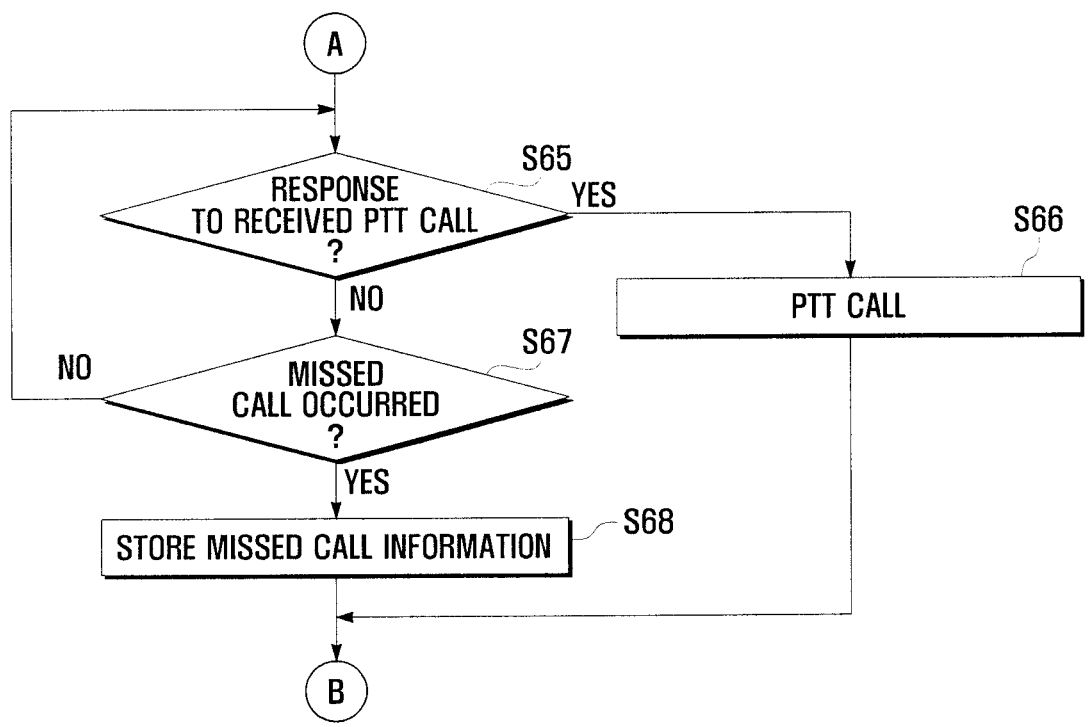

FIG. 4A and FIG. 4B are flowcharts showing the process of storing a missed call in the processing method of a missed call of a mobile communication terminal for PTT according to an exemplary embodiment of the present invention.

Referring to FIG. 1, FIG. 2, FIG. 4A and FIG. 4B, the process of storing missed call information 14b will be shown. At this time, the mobile communication terminal 10b for PTT for the receiving side is in a state in which the processing function of the missed call information is activated.

Initially, the mobile communications terminal for PTT for the receiving side 10b is in a standby state (S51). Then the PTT telephone call controller 12e determines whether a PTT telephone call has been received (S52). When it is determined that a PTT telephone call has not been received, the PTT telephone call controller 12e maintains the standby state (S51). When it is determined that a PTT telephone call has been received, the PTT telephone call controller 12e determines whether the storage number of the missed call information 14b is less than or equal to the maximum storage number (S53).

When it is determined that the maximum storage number has not been exceeded, the buffering unit 12c buffers the voice of the originator of the received PTT telephone call under the control of the PTT telephone call controller 12e (S54). The process when it is determined that the maximum storage number has been exceeded will be described below.

In step S55, the missed call determining unit 12d determines the response of the receiving side for the received PTT call. When it is determined that a response has occurred, the PTT telephone call controller 12e deletes the buffered voice and performs the PTT telephone call with the mobile communication terminal for PTT for the outgoing side 10a through the PTT communication module 12a (S56).

On the other hand, when it is determined that there has been no response, the missed call determining unit 12d determines whether the time for which there has been no response exceeds the set buffering time after the PTT telephone call is received (S57).

If it is determined that the set buffering time has not been exceeded, the missed call determining unit 12d determines whether a missed call has occurred (S58). When it is determined that a missed call has not occurred, the controller 12 again performs steps S54 to S57.

When it is determined that the set buffering time has been exceeded, the buffering unit 12c discontinues buffering the voice of the originator of the received PTT telephone call under the control of the PTT telephone call controller 12e (S59).

The missed call determining unit 12d determines whether there has been a missed call (S61). If it is determined that a missed call has not occurred, the controller 12 again returns to step S55.

If it is determined that a missed call has occurred, the PTT telephone call controller 12e stores the missed call information 14b including the buffered voice in the storage 14 (S62).

In step S63, the PTT telephone call controller 12e determines the storage number of the missed call information 14b stored in the storage 14. At this time, the PTT telephone call controller 12e counts only missed call information 14b including the voice of an originator.

Subsequently, the PTT telephone call controller 12e determines the termination according to the input of the end key (S64). When it is determined that the end key has not been input, the PTT telephone call controller 12e returns to the standby state of step S51. On the contrary, when it is determined that the end key has been input, the PTT telephone call is terminated.

When it is determined, at step S53, that the maximum storage number has been exceeded, the PTT telephone call controller 12e does not buffer of the voice of an originator. In step S65, the missed call determining unit 12d determines whether there has been a response to the received PTT call.

When it is determined that there has been a response, the PTT telephone call controller 12e performs the PTT call with the mobile communications terminal for PTT for the outgoing side 10a through the PTT communication module 12a (S66).

At this time, the PTT telephone call controller 12e does not have the buffered voice. Therefore, it does not perform the process of deleting the buffered voice. Subsequently, the PTT telephone call controller 12e performs step S64.

When it is determined that there has not been a response, the missed call determining unit 12d determines that a t missed call has occurred (S67).

When it is determined that a missed call has occurred, the PTT telephone call controller 12e stores the missed call information 14b in the storage 14 (S68). At this time, the stored missed call information 14b includes the originator phone number and the time when the missed call occurred, but does not include the voice of an originator. Subsequently, the PTT telephone call controller 12e performs step S64.

FIG. 5 is a flowchart showing the voice output of missed call information 14b and the displaying process, in the method of processing a missed call of a mobile communication terminal for PTT 10 according to an exemplary embodiment of the present invention.

Initially, the mobile communications terminal for PTT for the receiving side 10b is in a standby state (S71). Then, the PTT telephone call controller 12e determines whether it is converted to an active state (S72). When it is determined that it has not been converted to the active state, the PTT telephone call controller 12e maintains the standby state (S71).

Conversion into an active state is determined by key selection of the key input unit 13. That is, when a special key or an arbitrary key of the key input unit 13 is selected in the standby state, the PTT telephone call controller 12e is converted from the standby state into the active state.

When it is determined that there has been a conversion into the active state, the PTT telephone call controller 12e determines whether unconfirmed missed call information 14b exists among the missed call information 14b stored in the storage 14 (S73).

When it is determined that unconfirmed missed call information does not exist, the controller 12 displays the wall paper on the display unit 17 (S74).

If it is determined that unconfirmed missed call information 14b does exist, the PTT telephone call controller 12e displays a list of the unconfirmed missed call information 14b on the display unit 17 (S75). At this time, the PTT telephone call controller 12e can display the list of the unconfirmed missed call information 14b with using text or icons on the display unit 17.

The PTT telephone call controller 12e determines whether specific missed call information 14b among the list of the displayed missed call information has been selected. When it is determined that missed call information 14b has not been selected, the PTT telephone call controller 12e maintains the display mode of the missed call information list (S75).

When it is determined that missed call information 14b has been selected, the PTT telephone call controller 12e determines whether the selected missed call information 14b has a stored voice (S77).

If it is determined that a stored voice does not exist, the PTT telephone call controller 12e displays the missed call information 14b on the display unit 17 (S78). At this time, the missed call information 14b displayed on the display unit 17 includes the originator phone number and the time when the missed call occurred.

When it is determined that a stored voice exists, the PTT telephone call controller 12e outputs the voice that is stored among the missed call information 14b to the speaker SPK through the voice processor 16 (S79). The PTT telephone call controller 12e displays the originator phone number and the time when the missed call occurred on the display unit 17.

The PTT telephone call controller 12e determines whether there has been a delete request of the confirmed missed call information 14b (S81). When it is determined that there has been a delete request, the PTT telephone call controller 12e deletes the confirmed missed call information 14b (S82). Further, when the missed call information 14b to be deleted includes the voice of an originator, the PTT telephone call controller 14b reduces the storage number.

Then, the PTT telephone call controller 12e determines whether unconfirmed missed call information 14b exists. Further, when it is determined that there has not been a delete request, the PTT telephone call controller 12e performs step S83.

If it is determined that unconfirmed missed call information 14b exists, the PTT telephone call controller 12e starts again from step S75. On the other hand, if it is determined that unconfirmed missed call information 14b does not exist, the PTT telephone call controller 12e terminates the voice output and the display process of the missed call information 14b.

In the present exemplary embodiment, an example of confirming the unconfirmed missed call information was disclosed. However, when reaffirmation of missed call information stored in the storage is required, even if it is already confirmed, the PTT telephone call controller may output the voice of the originator included in the missed call information, which is requested for a reaffirmation, through the voice processor.

According to exemplary embodiments of the present invention, a PTT call is received and the voice of an originator is buffered. When a missed call occurs, missed call information including the buffered voice is stored. When confirmation of the missed call information is requested, the voice of an originator included in the missed call information is output. Therefore, a receiver can confirm the voice of an originator in verifying the missed call information. Accordingly, a receiver may be able to determine why the originator requested the PTT call.

In addition, when the receiver does not respond to the PTT call within a predetermined time, the originator can leave a short voice message and discontinue the PTT call. In this case, the receiver can confirm the short voice message of the originator through the missed call information.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed:

1. A method of processing missed call information at a mobile communication terminal for Push To Talk (PTT), comprising:
    buffering a voice of an originator of the PTT call in response to receiving a PTT call;
    identifying whether a response to the PTT call is generated within a time interval;
    storing missed call information including the buffered voice if the response is not generated within the time interval;
    outputting the buffered voice included in the stored missed call information in response to a request corresponding to the missed call information; and
    in response to the request or if the response to the PTT call is generated within the time interval, deleting the buffered voice.

2. The method of claim 1, wherein the voice of the originator is buffered for a predetermined time.

3. The method of claim 1, wherein the missed call information further includes at least one of originator information and a time when the missed call occurred.

4. The method of claim 1, wherein the response to the PTT call is generated by an user input to a PTT key attached to the mobile communication terminal.

5. The method of claim 1, further comprising setting a time for buffering the voice of the originator according to an user input.

6. The method of claim 1, further comprising setting a maximum storage number for storing missed call information according to an user input.

7. The method of claim 6, further comprising identifying whether a storage number of missed call information exceeds the maximum storage number.

8. The method of claim 7, further comprising storing at least one of originator phone number and a time when missed call occurred without storing the buffered voice, if the response is not generated within the time interval and the storage number of missed call information exceeds the maximum storage number.

9. The method of claim 1, further comprising setting a storage capacity for storing missed call information according to an user input.

10. The method of claim 1, wherein the request comprises an user input to a key input unit included in the mobile communication terminal.

11. A mobile communication terminal for Push To Talk (PTT), comprising:
    a PTT communications module configured to receive a PTT call;
    a buffering unit configured to buffer a voice of an originator of the PTT call in response to receiving the PTT call; and
    a controller configured to identify whether a response to the PTT call is generated within a time interval, store missed call information including the buffered voice if the response is not generated within the time interval, output the voice included in the stored missed call information in response to a request corresponding to the missed call information, and, in response to the request or if the response to the PTT call is generated within the time interval, delete the buffered voice.

12. The mobile communication terminal for PTT of claim 11, wherein the voice of the originator is buffered for a predetermined time.

13. The mobile communication terminal for PTT of claim 11, wherein the missed call information further includes at least one of originator information and a time when the missed call occurred.

14. The mobile communication terminal for PTT of claim 11, further comprising:
a PTT key used to perform the PTT communications,
wherein the response to the PTT call is generated by an user input to the PTT key.

15. The mobile communication terminal for PTT of claim 11, wherein the controller is further configured to set a time for buffering the voice of the originator according to an user input.

16. The mobile communication terminal for PTT of claim 11, wherein the controller is further configured to set a maximum storage number for storing missed call information according to an input.

17. The mobile communication terminal for PTT of claim 16, wherein the controller is further configured to identify whether a storage number of missed call information exceeds the maximum storage number.

18. The mobile communication terminal for PTT of claim 17, wherein the controller is further configured to store the missed call information including the originator phone number and a time when the missed call occurred without storing the buffered voice, if the response is not generated within the time interval and the storage number of missed call information exceeds the maximum storage number.

19. The mobile communication terminal for PTT of claim 11, wherein the controller is configured to set a storage capacity for storing missed call information according to an input.

20. The mobile communication terminal for PTT of claim 11, further comprising:
a key input unit,
wherein the request comprises an user input to the key input unit.

* * * * *